United States Patent [19]

Lower

[11] 4,183,590
[45] Jan. 15, 1980

[54] SELF-ALIGNING BEARING

[75] Inventor: Donald P. Lower, Mishawaka, Ind.

[73] Assignee: Eagle-Picher Industries, Inc., Cincinnati, Ohio

[21] Appl. No.: 889,202

[22] Filed: Mar. 23, 1978

[51] Int. Cl.² .............................................. F16C 23/00
[52] U.S. Cl. ................................ 308/72; 29/149.5 B; 29/149.5 PM; 308/15; 308/74; 403/114
[58] Field of Search ............ 308/29, 34, 72, 74, 308/161, 163, 165, 36.1, 187.1, 187.2, 194, 15; 29/148.4 B, 148.4 S, 149.5 B, 149.5 PM; 403/114

[56] References Cited

U.S. PATENT DOCUMENTS

| | | | |
|---|---|---|---|
| 1,649,258 | 11/1927 | Rummins | 308/165 |
| 1,825,293 | 9/1931 | Van Derhoef | 308/194 |
| 2,620,244 | 12/1952 | Beatty | 308/194 |
| 2,686,088 | 8/1954 | Nelson | 308/194 |
| 3,439,964 | 4/1969 | Stone et al. | 308/72 |
| 3,724,917 | 4/1973 | Pakulak | 308/194 |

FOREIGN PATENT DOCUMENTS 554879  7/1943  United Kingdom ...................... 308/72

Primary Examiner—Charles E. Frankfort
Attorney, Agent, or Firm—Wood, Herron & Evans

[57] ABSTRACT

A self-aligning bearing construction including a ball which can be used in a pillow block mounting mode, or a flange mounting mode, or in special mounting for specific applications. A pair of generally parallel flats are formed on the ball on opposite sides of the shaft bore therein, and two cylindrical lands extend transversely around the ball, connecting the flats. As a result of a sizing step, the ball may be formed with a bead or rib running around the ball centered on the cylindrical lands and across the flats. The lands and flats provide clearance spacing so that the bead does not engage seats in a cap and a base between which it is clamped. The ball is cooperable with a series of different caps and bases for use in different mounting modes and can receive any of a series of bearing inserts to provide different bearing service.

15 Claims, 8 Drawing Figures

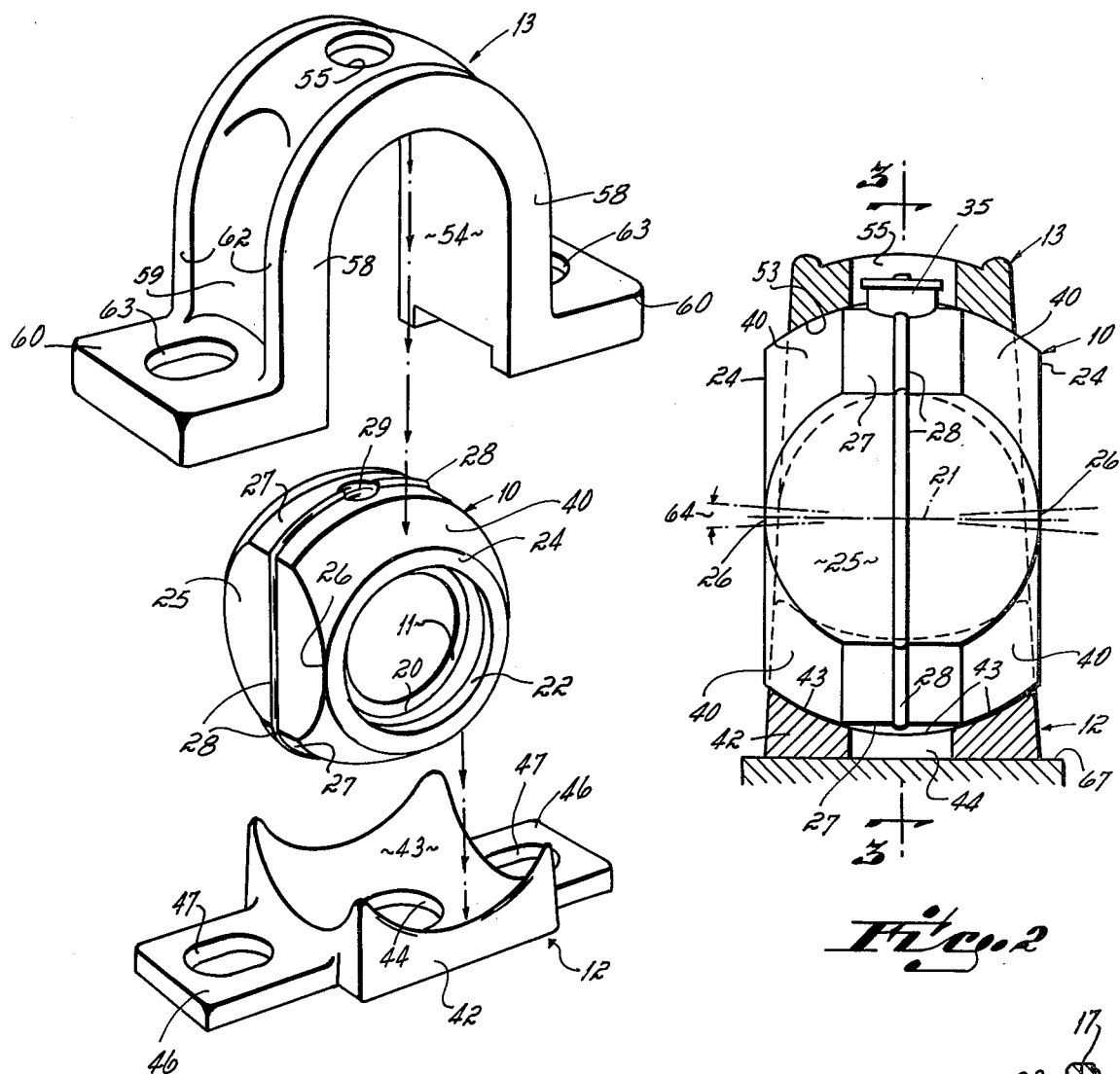
Fig. 1
Fig. 2
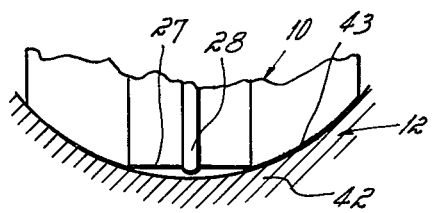
Fig. 5
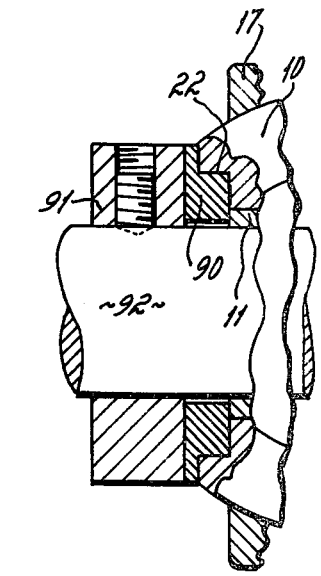
Fig. 6

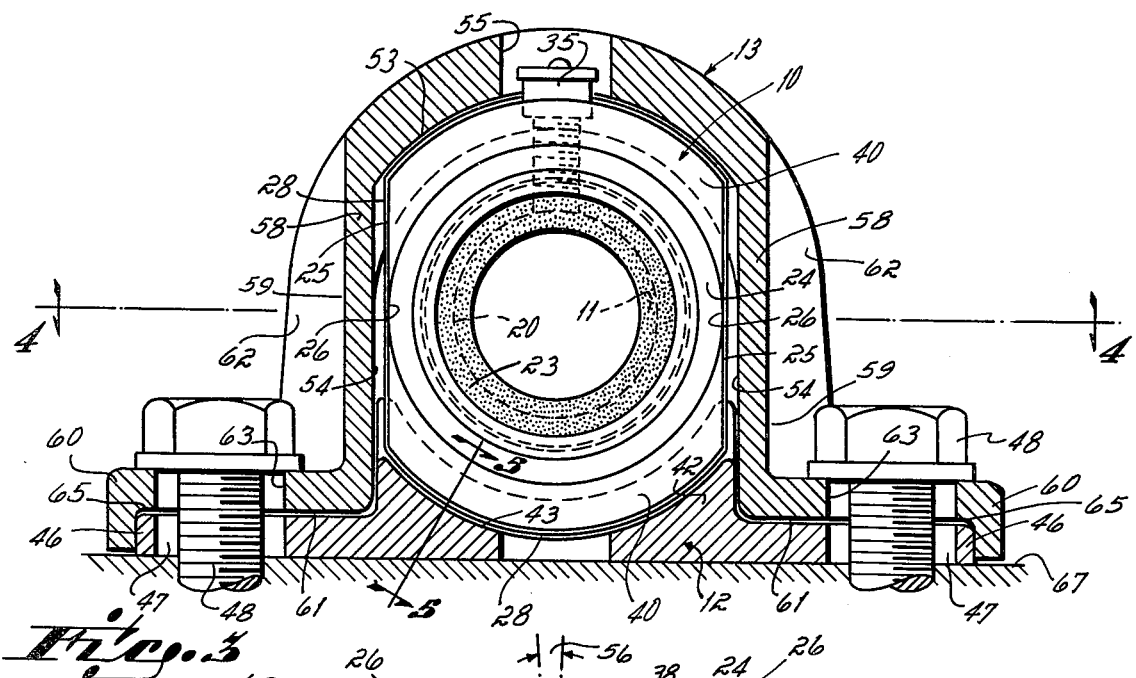
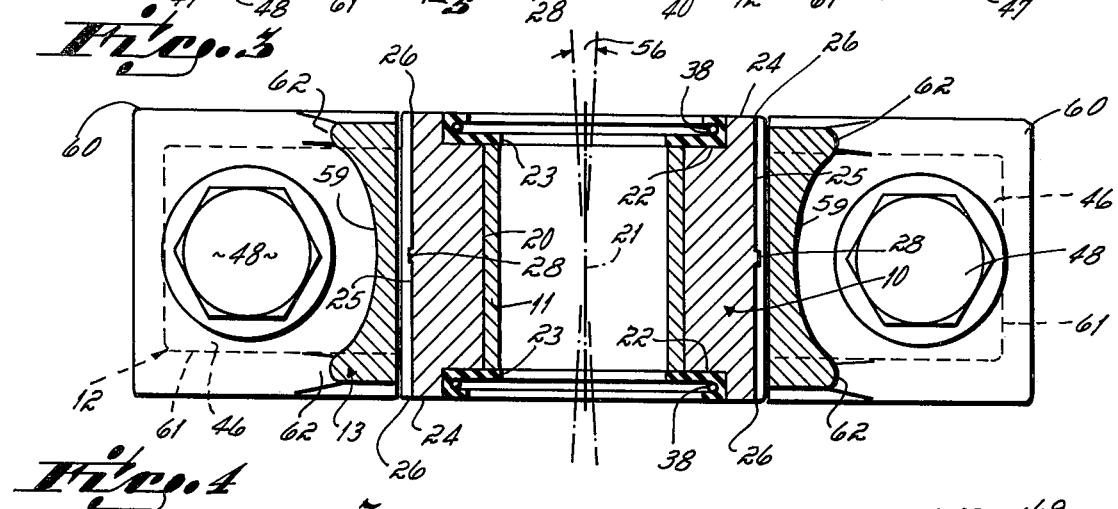
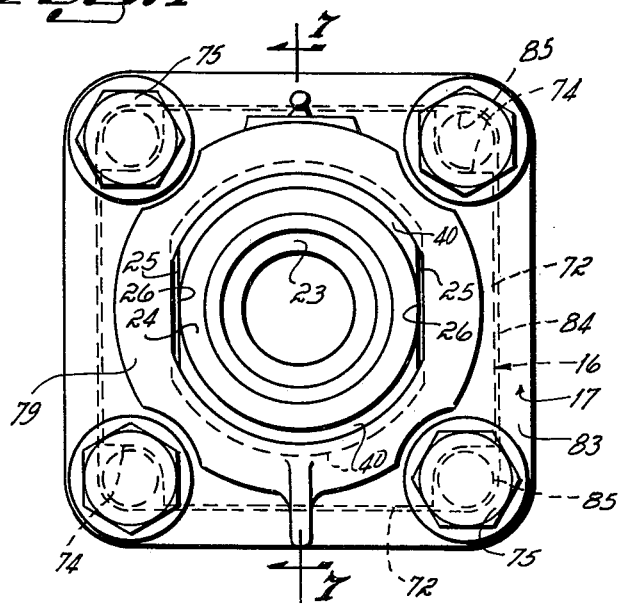
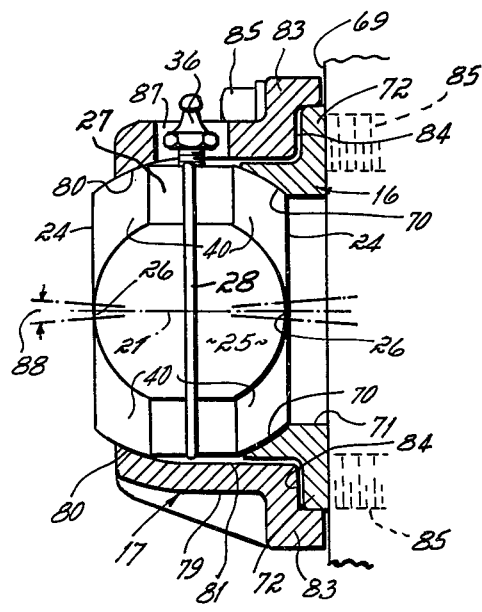

SELF-ALIGNING BEARING

FIELD OF THE INVENTION

The invention relates to shaft bearings of the type wherein a rotatable shaft is journaled in a ball which is self-alignable in a ball mounting.

BACKGROUND

Various types of shaft bearings are known in which the rotating shaft is journaled or carried in a generally spherical ball. The ball is in turn secured and housed in a multi-part housing which may include a base having a recess or seat in which one area of the ball is received, and a cap or covering which fits over or around an opposite area of the ball. The two housing members are secured together, to hold the ball between them. The universal alignability, at least over limited range, of the ball with respect to the housing enables the bearing to accommodate misalignment with the shaft.

Although there are many self-aligning shaft bearings of this general type, they have tended to involve relatively complex shapes and hence have been relatively expensive to manufacture. There has been a need for a simpler, less expensive self-aligning shaft bearing, apart from the type having a pressed steel housing which does not have the rigidity or appearance that is often required or desired.

Shaft bearings are typically classified either as a pillow block mounting or flange mounting. In a pillow block, the bearing is mounted to a support structure which is generally parallel to the axis of the rotating shaft, whereas in flange mountings the axis of the shaft extends generally perpendicularly to the surface of the support structure. Either type of mounting may be required to carry thrust loads as well as radial loads.

It can be seen that in a pillow block mounting, the clamping force acts on the ball in a direction perpendicular to the axis of the shaft bore, whereas in a flange-type mounting the clamping force on the ball acts in direction parallel to the axis of the shaft bore. The respective ball orientations differ by 90° in the two common types of mountings. For this reason, heretofore it has been the common practice to design given self-aligning bearings for one or the other, but not both types of mountings.

Because these bearings are widely used, the bearing manufacturer has thus been required to provide a wide range of different types of bearings, some with flange mountings, some for pillow block mountings and still others for special installations. The inventory problem has been further complicated by the need to supply bearings in each type for use with many different shaft diameters, and for various different types of bearing service. For example, for some applications, cast bronze journals are most effective; for others, needle bearings are desirable; in still others, high temperature bearings are needed, and so on. All of this has posed a need for bearings which are adaptable for more universal use, to different types of mountings, shaft sizes, bolt hole configurations, load and bearing service.

It has been an object of this invention to provide a self-aligning shaft bearing of relatively simple, rigid, and economical construction wherein a standardized ball can be used with a variety of mountings, in the pillow block mode, the flange mode, or other special mountings, and which can be clamped in either of two positions, at right angles to each other, without deformation or damage. The standardized ball is cooperable with a plurality of sets of caps and bases for various mountings. The standardized ball is also cooperable with a series of bearing inserts of different internal diameters for use with shafts of different diameters, and of different bearing materials and construction to provide different bearing service.

More specifically, in a preferred embodiment the bearing construction includes a ball which can be used in a pillow block mounting mode, a flange mounting mode, or other mounting. A pair of generally parallel flats are formed onto the ball, on opposite sides of the shaft bore therein. Two cylindrical lands extend transversely around the ball, connecting the opposed flats. The flats prevent rotation of the ball in the housing; and the flats and lands together minimize the width of the unit, as will be seen. The ball may be molded and/or sized with a bead running around the ball, centered on the cylindrical lands and the flats. The lands and flats also provide clearance spacing so that the bead does not engage seats in the base and cap between which the ball is clamped.

BRIEF DESCRIPTION OF THE DRAWINGS

The invention can best be further described by reference to the accompanying drawings, in which:

FIG. 1 is an exploded perspective view of a self-aligning bearing in accordance with a preferred embodiment of the invention, showing the ball with cap and base components for a pillow block-type mounting;

FIG. 2 is a vertical axial section of the assembled pillow block whose components are shown in FIG. 1;

FIG. 3 is a transverse vertical section taken on line 3—3 of FIG. 2;

FIG. 4 is a horizontal axial section taken on line 4—4 of FIG. 3;

FIG. 5 is an enlarged fragmentary section taken on line 5—5 of FIG. 3;

FIG. 6 is a top plan view of an alternative embodiment of the invention, showing the ball with base and cap components for a four-bolt flange-type mounting;

FIG. 7 is a vertical axial section taken on line 7—7 of FIG. 6, and

FIG. 8 is a fragmentary axial section showing the bearing with a thrust washer collar.

The invention includes a standardized shaft-aligning ball 10 which can receive any of a series of different sleeve bearing inserts, one of which is designated at 11 in FIG. 4. The ball can be used with different sets of caps and bases to provide a pillow block-type mounting, a flange, or other type of mounting, as desired.

FIGS. 1–5 show a ball 10 in conjunction with a pillow block base 12 and a pillow block cap 13. In FIGS. 6 and 7, a ball 10 is shown in conjunction with a four-bolt flange base 16 and a cooperating flange cap 17. The ball can be alternatively used with other caps and bases to provide, for example, a two-bolt flange mounting or a cylindrical flange mounting. The caps and bases are suitable for die casting, forging or molding in metal.

Ball 10 is generally spherical and has a dimetral through bore 20 (see FIG. 4) which receives the bearing insert 11. The axis of bore 20 is designated at 21 (FIG. 3). Ball 10 is counterbored as at 22, 22 at the opposite ends of bore 20, to receive seals 23, 23 or thrust washers as will be described. A flat annular area, as designated at 24 (see FIGS. 1 and 4) is formed around each counterbore 22.

Two generally parallel flats or side surfaces 25, 25 are formed on diametrically opposite sides of ball 10. These side flats tangentially touch the respective annular flats 24, 24 at each end of the ball, as at 26 (see FIG. 1). The outer surface of the ball is relieved to form cylindrically curved lands 27, 27 running between the opposite side flats 25, 25, and midway between the flat annular end areas 24, 24.

Ball 10 is preferably molded of powdered metal (for example, powdered iron) and sintered. (For some applications, the ball may alternatively be molded of plastic.) It may be made in accordance with manufacturing techniques which are known per se. In the powdered metal molding process, the ball after molding and sintering is sized between two dies. As a result of final sizing, a bead 28 in the form of an equitorial belt or rib 28 is formed which extends around the ball, across each side flat 25, 25 and along the cylindrical top and bottom lands 27, 27. A bore 29 is formed in ball 10 radially through top land 27 thereon, intersecting bead 28 and extending to internal bore 20. This bore 29 is counterbored and tapped, to receive a lubrication fitting which may be either a press-fitted oil fitting as shown at 35 in FIGS. 2 and 3, or a threaded grease fitting as shown at 36 in FIG. 7.

As indicated above, a series of different bearing inserts 11 are insertable in shaft bore 20 to journal a rotatable shaft, not shown. The length (in the axial direction) of each sleeve insert 11 corresponds to the axial dimension between the ball counterbores 22, 22, see FIG. 5. Each insert 11 has an outside diameter which is sized for a press-fit in bore 20; sleeves of different inside diameters are provided to journal shafts of different diameters. Sleeve inserts 11 are also provided of different materials, for example cast bronze, oil-impregnated powdered metal, reinforced filled Teflon, oil-lubricated polyacetal, high temperature carbon; or the bearing insert may be a needle bearing. The provision of a series of inserts of different internal diameters and different bearing types enables the same standardized ball 10 to be adapted for use with shafts of different diameters and for different bearing service, in accordance with the capabilities of the different types. The fabrication of the bearing inserts per se may be conventional. An aperture (not shown) may be formed in the insert to receive a wick from the lubrication fitting 35.

The flexible shaft seals 23, 23 are fitted in the counterbores 22, 22 to prevent entry of contamination and loss of lubricant. They may be of Buna-N rubber, and are U or J-shaped in sectional configuration (see FIG. 4), to match the sizing of the bearing inserts. They are held in the counterbores by expanding spring snap rings 38, 38.

Where the bearing is to carry a thrust (axial) load, a thrust washer 90 may be inserted in a counterbore 22 in place of the seal, to abut a thrust collar 91 on the shaft 92, as shown in FIG. 8. The thrust washer is desirably of the same bearing material as the bearing insert 11.

In both the pillow block and flange mounting modes, the ball 10 is engaged and supported by and between the base and cap over spherical areas designated by 40, which lie between side flats 25, cylindrical lands 27, and annular end flats 24. These convex spherically curved surfaces 40 are all generated about the same center and have the same radius. The cap and seat present concave seat surfaces which are formed to match the ball surfaces 40.

Taking up the pillow block mounting first, pillow block base 12 includes a central portion 42 which is generally rectangular in plan and in which an upwardly opening ball seat 43 is formed. An aperture 44 may be formed at the base of the cavity 43, to permit ball 10 to be mounted "upside-down", i.e., with the lubrication fitting projecting through the base aperture 44, as may be desirable for some installations.

On opposite sides of central portion 42 of base 12 a pair of wings 46, 46 project. The wings are approximately parallel to ball axis 21 in the assembled bearing. Slots or apertures 47, 47 are provided in base wings 46, 46 for receiving mounting means such as bolts 48, 48 that secure the assembly to a mounting surface 67 which, for purposes of explanation, is shown as being horizontal.

Since the concave seat 43 in the base matches the curvature of the spherical areas 40 of ball 10, the seat will receive the ball in various orientations, to accommodate the alignment of a particular shaft.

The cap 13 which cooperates with pillow block base 12 is generally of an inverted U shape, as shown in FIG. 3. At the top of the "U" the cap presents a downwardly facing concave seat 53. The oil or grease fitting 35 or 36 on ball 10 projects into an aperture 55 at the apex of cap 13 (see FIGS. 2 and 3), and thus is accessible through the cap for lubrication. The cap's upstanding legs 58, 58 present opposite inside flat surfaces 54, 54 which extend downwardly from concave seat 53, i.e., toward mounting surface 67. The legs are slightly angulated outwardly to provide molding draft. At the bottom, the spacing between the legs is sufficient to accommodate base center portion 42 (see FIG. 2).

As shown in FIGS. 3 and 4, the spacing between the flat inside surfaces 54, 54 of cap 13 slightly exceeds the width dimension of ball 12, as measured between the beads 28, 28 on the flat sides 25, 25 of the ball. This clearance establishes a limited range of canting or tipping as designated at 56 in FIG. 4, of ball axis 21 in a plane perpendicular to cap side surface 25, 25.

At the lower ends of its legs 58, 58 cap 13 is provided with mounting means in the form of a pair of flanges 60, 60 which have external dimensions greater in length, width and height, than those of base wings 46, 46. The cap flanges are recessed on their lower sides to form pockets 61, 61 sized to receive the respective base wings 46, 46 so as effectively to cover them and hold the base securely in position with respect to the cap, as shown in FIG. 3. Mounting apertures 63, 63 are formed in the cap flanges, substantially aligned with the apertures 47, 47 in the base wings, so that bolts 48, 48 can pass through. As can be seen in FIGS. 2, 3 and 4, in the assembled pillow block the cap thus overlies and substantially covers the base, the only visible portion of the base being the center portion 42 thereof, between the legs 58, 58 of the cap.

On the outward face of each cap leg 58, a recess 59 is defined between a pair of spaced strengthening ribs 62, 62 (FIG. 1). This recess 59 provides clearance around the head of the mounting bolt 48 (FIG. 4). The flattening of ball sides 24, 24 and cap sides 54, 54 thus minimize the overall width of the unit, thereby reducing the required spacing between bolts 48, 48. It also provides a stop for limiting the range of alignment of the ball in the cap, and prevents rotation of the ball if no lubrication fitting is used.

The axis 21 of ball bore 20 can be cocked in a vertical plane through an angle 64 as designated in FIG. 2. The angle is limited by the points at which the lubrication fitting abuts the opposite sides of the cap aperture 55. In practice, alignment ranges of about ⅛" per foot are adequate for angles 56 and 64.

Preferably the cap flanges 60, 60 are so sized that at assembly, when ball 10 is first seated between base seat 43 and cap seat 53, a slight vertical gap or space 65 is presented between the proximate surfaces of base wings 46 and cap flanges 60, see FIG. 3. When the bolts 48, 48 are drawn toward the underlying or support structure 67, the cap flanges are pressed toward the base wings, so that a clamping force acts on the ball, over the spherical areas 40 thereof.

It is important to note that with the ball properly seated, neither the base nor the cap engages or exerts pressure on the narrow bead 28 which extends around the ball as a belt or equator. This is because the external dimension of the ball, as measured to the bead 28, 28 on the opposite lands 27, 27 at the top and bottom of the ball, is slightly less than the diameter of the ball through the opposite spherical surfaces 40, 40. In other words, the land 27 provides relief so that the bead, even though it stands proud of the land, will not present a narrow line of contact. This eliminates any need to grind off the bead where it might otherwise contact the seats 43 or 53. The clamping force acts on the ball over the relatively large spherical areas 40 and, since the bead 28 is not subjected to a concentrated force, consequent cracking or deformation of the ball is avoided.

In the flange mounting embodiment of FIGS. 6 and 7, the same standardized ball 10 is shown, although it is illustrated with a different lubrication fitting 36. In this embodiment ball axis 21 is directed perpendicularly to the mounting surface 69. Base 16 presents a seat 70 of a concavity matching the curvature of ball spherical areas 40. A central aperture 71, having a diameter substantially equal to the diameter of ball flat annulus 24, may be provided in the base for weight reduction purposes and clearance. A wing 72 extends around the base and may be of generally square configuration as seen is plan (FIG. 6), notched at its corners as at 74 to receive mounting bolts 75.

The flange mount cap 17 which cooperates with base 16 has a center portion 79 which is generally round in outline, as viewed in plan (see FIG. 6) and which is open at the top, in contrast to the cap of the pillow block embodiment. Shaft axis 21 passes axially through the cap.

The cap center portion presents a ball seat 80 that leads inwardly to an essentially cylindrical wall 81. Adjacent the base, a flange 43 projects outwardly from cap center portion 79. This flange receives and covers the base wing 72. A pocket 84 is formed on the underside of cap flange 83, into which base wing 72 fits in nest relationship. Bolt holes 85 are formed through the cap flange at the corners.

From FIG. 7 it will be noted that, as in the pillow block embodiment, the bead 28 around ball land 27 does not contact and is not subjected to compressive loading by the cap or the base. The provision of land 27 reduces the diameter of the cap at the mold line, so that clearance is provided between the mold line and the cylindrical inner wall 81 of the cap. The ball lubrication fitting 36 extends through an aperture 87 in the cap side wall. The ball axis 21 can be tipped or cocked through an angle 88, between the positions at which fitting 36 contacts the opposite sides of aperture 87.

While I have described herein the preferred embodiment of the invention, those skilled in the art will recognize that it can be incorporated in other embodiments and variations, within the scope of the follwing claims.

What is claimed is:

1. In self-aligning shaft bearing structure of the type including a generally spherical molded ball having a diametral bore, a base and a cap presenting opposed seats, the ball being receivable between the base and the cap in said seats for aligning with a shaft to be received in said bore, the improvement comprising,
a pair of generally parallel flats formed on opposite sides of said ball,
a pair of cylindrical lands on the ball extending transversely to said bore and running between the said flats,
said ball having a bead running circumferentially around it as a result of molding, said bead being centered on said flats and lands,
the lands and flats providing clearance spacing so that the bead does not engage the seats of said cap and base when said ball is seated therein to thereby avoid concentrated loading of said molded ball that could cause cracking or deformation thereof.

2. In self-aligning shaft bearing structure of the type including a generally spherical ball having a diametral bore, a base and a cap presenting opposed seats, the ball being receivable between the base and the cap in said seats for aligning with a shaft to be received in said bore, the improvement comprising,
a pair of generally parallel flats formed on opposite sides of said ball,
a pair of cylindrical lands on the ball extending transversely to said bore and running between the said flats,
said ball having a bead running circumferentially around it, said bead being centered on said flats and lands,
the lands and flats providing clearance spacing so that the bead does not engage the seats of said cap and base when said ball is seated therein,
said cap having opposite inwardly facing flat sides adjacent the seat thereof,
the spacing between the sides of said cap slightly exceeding that of the flats of the ball to permit a limited range of alignability of the ball in the cap, between positions at which a flat of the ball comes to bear against a flat side of the cap.

3. The improvement of claim 2 wherein said cap is in the form of an inverted "U" with said seat formed at the top thereof and said flat sides formed on the legs of said "U," and a mounting flange projects from each said leg, perpendicularly to said sides.

4. The improvement of claim 3 wherein said ball is molded and sized.

5. The improvement of claim 3 wherein said base has a mounting wing projecting outwardly from a center portion thereof, and the mounting flange of said cap is recessed on a lower face thereof to present a pocket for receiving and covering the wing of said base.

6. In self-aligning shaft bearing structure of the type including a generally spherical ball, a base presenting an upwardly opening seat in which the ball is seated, and a cap presenting a downwardly opening seat for engaging the ball to clamp it against the base in a position of desired alignment, the improvement comprising, a ball standardized for use with different bases and caps for mounting in different attitudes and for use with different bearing inserts for providing different bearing service, said ball having a diametral bore formed therethrough, a series of different bearing inserts, all sized externally to be press-fitted into the bore of said ball, the inserts being of different internal diameters and fabricated from different bearing materials, a plurality of sets of different bases and cooperating caps for use with said ball, the various sets of bases and caps being of different mounting configurations, the seat in each said base being formed in a center portion thereof, each base having a mounting wing projecting outwardly from the center portion thereof, the seat in each said cap being formed in a center portion thereof, and a mounting flange projecting outwardly from said center portion of said cap to overlie the wing of the base of the respective set, said ball having a pair of flats formed on its outer surface on opposite sides of said bore, the cap of at least one of said sets having flat sides adjacent the seat therein, the spacing between the sides of said cap slightly exceeding that of the flats of the ball, to permit a limited range of alignability of the ball in the cap, between positions at which a flat of the ball comes to bear against a side of the cap.

7. The improvement of claim 6 wherein the cap of said one set is in the form of an inverted "U" with said seat formed at the top thereof and said sides defining the legs of said "U," and a mounting flange projects from each said leg, perpendicularly to said sides.

8. The improvement of claim 7 wherein said ball has opposite cylindrical lands extending transversely to said bore, and between said flats, further wherein said ball is formed with a bead which runs around it on said cylindrical lands thereon, the lands and flats providing clearance spacing so that said bead thereon does not engage the seats in said cap and base.

9. The improvement of claim 8 further wherein said ball is molded of powdered metal.

10. The improvement of claim 6 wherein one of said sets of caps and bases comprises a pillow block mounting for said ball, with the bore thereof parallel to the plane of said wing, and wherein another of said sets of caps and bases comprises a flange mounting for said ball with the bore thereof perpendicular to the plane of said wing.

11. The improvement of claim 6 wherein said cap and base are each integral die castings.

12. The improvement of claim 6 further wherein said ball has a counterbore at each of said bore therethrough, and wherein elastomeric seals are received in the counterbores to cover the ends of the insert in the ball bore, to prevent entry of contamination and loss of lubricant.

13. The improvement of claim 6 wherein the mounting flange of the cap is spaced slightly above the wing of the base when the ball is seated between the cap and base, and wherein mounting bolts force said flange and wing together to clamp the ball in fixed position between them.

14. The improvement of claim 6 wherein the mounting flange of each said cap is recessed on a lower face thereof to present a pocket for receiving and covering the wing of the respective base, and said flange and wing present aligned apertures for receiving mounting bolts.

15. The improvement of claim 6 further including a counterbore in said ball around an end of said bore, and a set of thrust washers insertable in said counterbore to receive thrust from a shaft journaled in one of said inserts in said bore, the members of said set of thrust washers being of different internal diameters and fabricated of different bearing materials, to match different inserts of said series.

* * * * *